(12) United States Patent
Cheng

(10) Patent No.: US 7,366,361 B2
(45) Date of Patent: Apr. 29, 2008

(54) VIDEO REGISTRATION BASED ON LOCAL PREDICTION ERRORS

(75) Inventor: Hui Cheng, Bridgewater, NJ (US)

(73) Assignee: Sarnoff Corporation, Princeton, NJ (US)

( * ) Notice: Subject to any disclaimer, the term of this patent is extended or adjusted under 35 U.S.C. 154(b) by 573 days.

(21) Appl. No.: 10/792,073

(22) Filed: Mar. 3, 2004

(65) Prior Publication Data
US 2004/0184530 A1 Sep. 23, 2004

Related U.S. Application Data

(60) Provisional application No. 60/452,153, filed on Mar. 5, 2003.

(51) Int. Cl.
*G06K 9/32* (2006.01)
(52) U.S. Cl. ........................... 382/294; 348/584
(58) Field of Classification Search ................. 382/294
See application file for complete search history.

(56) References Cited

U.S. PATENT DOCUMENTS

| | | | | |
|---|---|---|---|---|
| 4,786,979 A | * | 11/1988 | Claus et al. ................. | 386/129 |
| 6,285,774 B1 | * | 9/2001 | Schumann et al. ......... | 382/100 |
| 2002/0094135 A1 | * | 7/2002 | Caspi et al. ................. | 382/294 |
| 2003/0065409 A1 | | 4/2003 | Raeth et al. .................... | 700/31 |
| 2003/0133503 A1 | | 7/2003 | Paniconi et al. ........ | 375/240.16 |

OTHER PUBLICATIONS

"Spatio-Temporal Alignment of Sequences", Y. Caspi and M. Irani, IEEE Trans. on Pattern Analysis and Machine Intelligence, vol. 24, No. 11, pp. 1409-1424, Nov. 2002.*

"Composition of Geometrical Deformations for Watermark Extraction in the Digital Cinema Application", Delannay et al., SPIE Security and Watermarking of Multimedia Contents III, vol. 4314, pp. 149-157, Aug. 2001.*

"Registration of Video to Geo-Referenced Imagery", Rakesh Kumar et al., Proce. ICPR 98, Brisbane, Australia, Aug. 1998, 4 pages.

"Alignment of Non-Overlapping Sequences", by Yaron Caspi et al., Proc. Of IEEE Int'l Conf. On Computer Vision, Vancouver, BC, Canada, Jul. 2001, pp. 1-19.

"Fundamentals of Digital Image Processing", by Anil K. Jain, Prentice Hall, 1989, pp. 241-244.

"Image Analysis for Video Artifact Estimation and Measurement", Jiuhuai Lu, Proceedings of SPIE vol. 4301, 2001, pp. 166-174.

"Estimation of Geometric Distortions in Digital Watermarking", Sverine Baudry et al., IEEE Int'l Conf. On Image Processing, Rochester, NY, Sep. 2002, pp. 885 to 888.

* cited by examiner

*Primary Examiner*—Brian Werner
*Assistant Examiner*—Jared Radkiewicz
(74) *Attorney, Agent, or Firm*—Lowenstein Sandler, PC

(57) ABSTRACT

A processed (e.g., captured) video sequence is temporally, spatially, and/or histogram registered to the corresponding original video sequence by generating, for each set of one or more processed frames, a mapping from a selected set of one or more original frames to the processed set, wherein (1) each selected set depends on the selected set corresponding to a previous processed set, (2) each mapping minimizes a local prediction error between the original set and the corresponding processed set, and (3) the accumulated prediction error for the entire processed video sequence is minimized.

23 Claims, 3 Drawing Sheets

VIDEO REGISTRATION BASED ON LOCAL PREDICTION ERRORS

CROSS-REFERENCE TO RELATED APPLICATIONS

This application claims the benefit of the filing date of U.S. provisional application no. 60/452,153, filed on Mar. 5, 2003.

STATEMENT REGARDING FEDERALLY SPONSORED RESEARCH OR DEVELOPMENT

The Government of the United States of America has rights in this invention pursuant to the U.S. Department of Commerce, National Institute of Standards and Technology, Advanced Technology Program, Cooperative Agreement Number 70NANB1H3036.

BACKGROUND OF THE INVENTION

1. Field of the Invention

The present invention relates to video processing, and, in particular, to the registration of video sequences.

2. Description of the Related Art

Video registration refers to the process of identifying the (e.g., temporal, spatial, and/or histogram) correspondence between two video sequences, e.g., an original video sequence and a processed video sequence generated from the original video sequence.

For many applications, such as watermark detection and reference-based video quality measurement, a processed video sequence may need to be registered to the original sequence. For example, to detect watermarks embedded in pirated videos that are shot using a camcorder, the processed video may need to be registered to the original one displayed in the theater. Another area where video registration is typically needed is in reference-based video quality measurement. To ensure quality of service (QoS), it is often necessary to measure the quality degradation between the original video and the one received by a client. The received video is often a processed version of the original video. Therefore, to achieve a meaningful reference-based quality measurement, the received video is first registered with respect to the original video sequence.

Differences between a processed video and the original one often result from a combination of spatial misalignment, temporal misalignment, and histogram misalignment. Spatial misalignment is the result of spatial manipulation of a video sequence, such as warping, cropping, and resizing (e.g., capturing a movie with 2.35:1 aspect ratio using a camcorder with 4:3 aspect ratio). The main causes of temporal misalignment are (1) the change of temporal resolution, such as frame rate conversion (e.g., 3-2 pull down), and (2) the dropping and/or repeating of frames used by video compression algorithms (e.g., MPEG-4). The video capturing process also causes temporal misalignment, because the displaying and the capturing generally (1) are not synchronized and (2) operate at different frame rates. In addition, processed videos in general have different color histograms from the original videos. This is often the result of video processing, such as compression, filtering, or gamma changes. It can also be the result of white balance or automatic gain control (AGC) in camcorder capture.

Spatial, temporal, and histogram registration can be used to correct the three types of misalignment. Spatial registration and histogram registration have been studied by many researchers. However, few studies have been done on temporal registration. A temporal registration scheme for video quality measurement was proposed in Jiuhuai Lu, "Image analysis for video artifact estimation and measurement," *Proc. of SPIE Machine Vision Applications in Industrial Inspection*, v. 4301, pp. 166-174, San Jose, Calif., January 2001, the teachings of which are incorporated herein by reference. This scheme can recover the global offset between two video sequences. The global offset is estimated by maximizing the normalized correlation between temporal activity signatures extracted from each sequence. Caspi and Irani use a direct search for recovering sequence-level temporal misalignment, such as fixed shift or fixed frame rate conversion. See Y. Caspi and M. Irani, "Alignment of non-overlapping sequences," *Proc. of IEEE Int'l Conf. on Computer Vision*, Vancouver, BC, Canada, July 2001.

SUMMARY OF THE INVENTION

Limitations in the prior art are addressed in accordance with the principles of the present invention by a temporal registration algorithm for video sequences that, in one embodiment, formulates the temporal registration problem as a frame-level constrained minimization of a matching cost and, solves the problem using dynamic programming. The algorithm is developed based on a frame-level model of the temporal misalignment often introduced by video processing algorithms, such as compression, frame-rate conversion, or video capturing. One advantage of the present invention is that it can be generalized to incorporate spatial and/or histogram registration. Depending on the application, accurate detection of frame-level misalignments enables corrections to be made to compensate for those misalignments.

A registration algorithm of the present invention can detect temporal misalignment at the sub-sequence (e.g., frame) level instead of only at the sequence level, as in the prior art. Therefore, it can recover from a much wider range of temporal misalignments, such as frame dropping or repeating. In addition, temporal registration can be combined with spatial and/or histogram registration to recover from spatial misalignments (e.g., changes of image size during capturing) and/or histogram misalignments (e.g., resulting from automatic gain control during capturing). It not only allows the registration to be performed according to the video data, but also allows the integration of prior knowledge of what the registration should be in the form of contextual cost. Therefore, further improvement of both the accuracy and the robustness of the algorithm is possible. The contextual cost can also be adjusted according to the application by using domain-specific contextual information.

According to one embodiment, the present invention is a method for identifying correspondence between an original video sequence comprising a plurality of original frames and a processed video sequence comprising a plurality of processed frames. The processed video sequence is divided into a plurality of processed sets, each processed set having one or more processed frames. For each processed set, one or more original sets from the original video sequence are identified, wherein each original set comprises one or more original frames, and two or more original sets are identified for at least one processed set. A mapping is generated for each original set corresponding to each processed set, wherein the mapping defines, for the original set, a mapped set that approximates the corresponding processed set, and the mapping minimizes a local prediction error between the mapped set and the corresponding processed set. For each processed set, the original set whose mapping minimizes an accumulated prediction error for the processed video sequence is selected.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

As used in this specification, the term "video sequence" refers to a set of one or more consecutive video frames (or fields). In the context of video registration, the term "video sequence" may be considered to be synonymous with "processing window" and "registration window." Depending on the particular implementation details for the video registration application, a video stream may be treated as a single video sequence (i.e., one window) or divided into a plurality of consecutive video sequences (i.e., multiple windows).

Frame-Level Model of Processed Video Sequences

This section discusses a model for processed video at the frame level. One application for this model is to characterize the video process, where a video displayed in a movie theatre has been captured using a camcorder.

Original video frames are denoted as $I_i$ and processed video frames as $J_j$, where i is the frame index of the original video sequence, $0 \leq i \leq N$, and j is the frame index of the processed video sequence, $0 \leq j \leq M$. A processed frame $J_j$ can be modeled according to Equation (1) as follows:

$$J_j = \phi_{k(j)}[I_{\alpha(j)-\beta(k(j))+1}, \ldots, I_{\alpha(j)}], \quad (1)$$

where $\phi_{k(j)}$ is one of K possible mapping functions indexed by k(j). Each of the K mapping functions maps a set of one or more frames of the original video to one frame of the processed video. The number of frames needed for the k-th mapping function is denoted by $\beta(k)$. The matching index $\alpha(j)$ is the largest index in the set of original frames that maps to the processed frame $J_j$.

Figure 1:
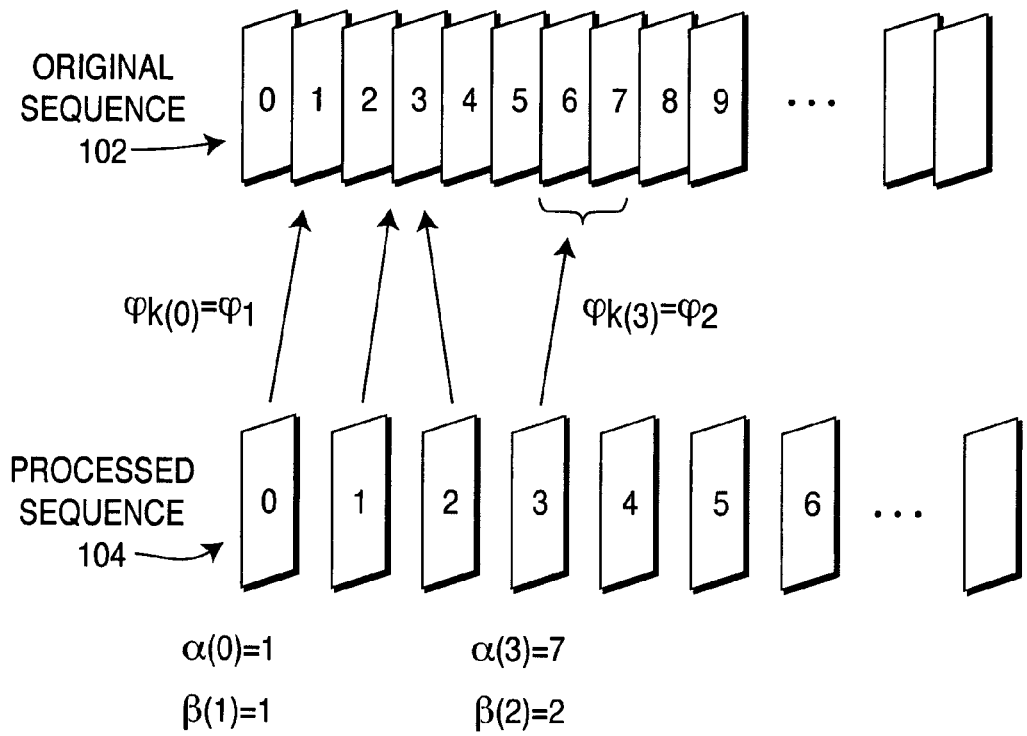
FIG. 1 illustrates an exemplary video process in which a processed video sequence is generated from an original video sequence.

FIG. 1 illustrates an exemplary video process in which a processed video sequence 104 is generated from an original video sequence 102. As shown in FIG. 1, processed frame 0 is generated from original frame 1, processed frames 1 and 2 are both generated from original frame 3, and processed from 3 is generated from original frames 6 and 7.

Two mapping functions, $\phi_1$ and $\phi_2$, are used in the example. The number of input frames for $\phi_1$ and $\phi_2$ are $\beta(1)=1$ and $\beta(2)=2$, respectively. With matching index $\alpha(0)=1$, $\phi_1$ maps original frame 1 to processed frame 0. On the other hand, with matching index $\alpha(0)=7$, original frames 6 and 7 are mapped to processed frame 3 by mapping operation $\phi_2$.

The model of Equation (1) is a general frame-level video processing model. It can be applied not only to captured video, but also to other frame-level processing including some widely used temporal manipulations, such as frame skipping and frame repeating. For example, as shown in FIG. 1, original frames 2, 4 and 5 are not associated with any processed frame. Therefore, they are skipped frames. In addition, processed frames 1 and 2 are the same, having both been generated from original frame 3. As such, they provide an example of frame repeating.

With the notations defined above, the video registration problem becomes: Given original video frames $I_i$ and processed video frames $J_j$, estimate the mapping functions $\phi_{k(j)}$ and matching indices $\alpha(j)$. One way to estimate $\phi_{k(j)}$ and $\alpha(j)$ is to minimize the distortion between the processed video frames $J_j$ and the model predictions from the original sequence over all possible combinations of k(j) and $\alpha(j)$ for all j.

The minimization problem may be subject to a causal constraint on $\alpha(j)$. That is, no frames displayed in the past can be processed at the present time. Formally, this constraint can be expressed as:

For any given $j_1$ and $j_2$ if $j_1 < j_2$, then $\alpha(j_1) \leq \alpha(j_2)$ In addition, although other suitable measures of distortion may be used, the following discussion assumes the use of the mean squared error (MSE) as the distortion measure. Therefore, the registration $[k^*(0), \alpha^*(0), \ldots, k^*(M), \alpha^*(M)]$ determined by minimizing the distortion in light of the causal constraint can be computed by Equation (2) as follows:

$$[k^*(0), \alpha^*(0), \ldots, k^*(M), \alpha^*(M)] = \underset{[k(0), \ldots, k(M), \alpha(0) \leq \cdots \leq \alpha(M)]}{\arg\min} \sum_{j=0}^{M} \|J_j - \varphi_{k(j)}[I_{\alpha(j)-\beta(k(j))+1}, \ldots, I_{\alpha(j)}]\|^2 \quad (2)$$

Since k(j) for j=0, ..., M can be optimized independently and there is only causal dependency among $\alpha(j)$, the optimization defined in Equation (2) can be solved using dynamic programming.

Figure 2:
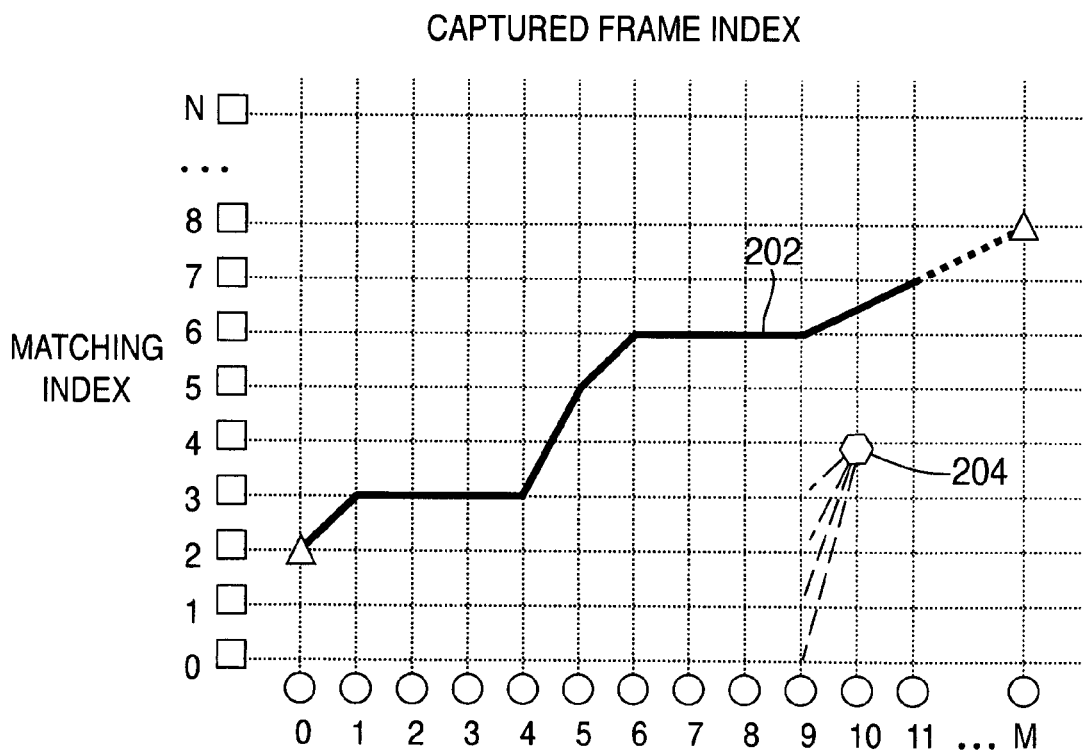
FIG. 2 shows a grid that can be used to determine temporal registration using dynamic programming.

FIG. 2 shows a grid that can be used to determine temporal registration using dynamic programming. In particular, the horizontal axis represents the different frames in the processed video sequence from 0 to M, while the vertical axis represents all possible corresponding matching index $\alpha(j)$, i.e., the index of the highest-index original frame used to generate processed frame $J_j$.

To solve Equation (2) using dynamic programming, the minimization of Equation (2) may be partitioned into stages according to the index j of the processed frame $J_j$. The state for each stage is $\alpha(j)$, also denoted as i. In the grid of FIG. 2 defined by stages and states, a path (e.g., 202), defined as a mapping from stages to states, is denoted as i(j). The cost function to be minimized in Equation (2) is the minimal accumulated mean squared error over all mapping functions from stage 0 to stage M along any feasible path.

However, because of the causal constraint $\alpha(0) \leq \alpha(1) \leq \ldots \leq \alpha(M)$, a path in FIG. 2 is a feasible path only if it is monotonically increasing (i.e., non-decreasing) (in value). FIG. 2 shows a feasible path 202 from stage 0 to stage M. FIG. 2 also shows all feasible paths (as dashed lined) that pass through a particular grid point 204. The solution to Equation (2) is the monotonically increasing path from stage 0 to stage M that has the minimal accumulated mean squared error.

If δ(M) denotes the accumulated MSE over a feasible path from stage 0 to stage M, then:

$$\delta(M) \equiv \min_{[k(0),\ldots,k(M),\alpha(0)\leq\ldots\leq\alpha(M)]} \sum_{j=0}^{M} \|J_j - \varphi_{k(j)} \quad (3)$$

$$[I_{\alpha(j)-\beta(k(j))+1}, \ldots, I_{\alpha(j)}]\|^2$$

$$= \min_{\alpha(M-1)\leq\alpha(M)} \left\{ \min_{[k(0),\ldots,k(M-1),\alpha(0)\leq\ldots\leq\alpha(M-1)]} \sum_{j=0}^{M-1} \|J_j - \varphi_{k(j)} \right.$$

$$[I_{\alpha(j)-\beta(k(j))+1}, \ldots, I_{\alpha(j)}]\|^2 + \min_{k(M)} \|J_M - \varphi_{k(M)}$$

$$\left. [I_{\alpha(M)-\beta(k(M))+1}, \ldots, I_{\alpha(M)}]\|^2 \right\}$$

$$= \min_{\alpha(M-1)\leq\alpha(M)} \left\{ \delta(M-1) + \min_{k(M)} \|J_M - \varphi_{k(M)} \right.$$

$$\left. [I_{\alpha(M)-\beta(k(M))+1}, \ldots, I_{\alpha(M)}]\|^2 \right\}$$

Therefore, the dynamic programming can be summarized as the following three steps:

(1) Compute the minimal mean squared error at each node (j, i):

$$k^*(j \mid \alpha(j) = i) = \arg\min_k \|J_j - \varphi_k [I_{i-\beta(i)-1}, \ldots, I_i]\|^2 \quad (4)$$

(2) Recursively, as shown in Equation (3), compute δ(j), for j=0, 1, ..., M.

(3) After the minimal accumulated MSE for the last stage (δ(M)) is calculated, back trace to compute [k*(0), α*(0), ... k*(M),α*(M)].

Temporal Registration for Camcorder Capture of Feature Films

The previous section proposed a general model for registering processed video. This section applies the general model to temporal registration of, e.g., camcorder-captured movies.

There are three main causes of the temporal misalignment between an original movie and a captured video of that movie. First, the original movie generally displays at a different frame rate from the one used for capturing. For example, movies are usually played at 24 frames per second (fps), while a camcorder records a video at 30 fps or 60 fields per second. In addition, there is typically an initial offset between when a movie is displayed and when the first frame is captured. Finally, the frame rates for displaying and capturing may drift. This is particularly the case when projecting and/or capturing using film, where the film is transferred from one roller to the other, and changes in the effective diameter of each roller can cause a slight change in the frame rate. Because of these three factors, each processed video frame generally does not correspond to a single frame of the original sequence. For example, when displaying at 24 fps and capturing at 30 fps, most of the processed frames are the weighted average of two adjacent frames in the original sequence when each of the two adjacent frames are displayed during a different portion of the video camera's integration time for the corresponding processed frame.

Figure 3:
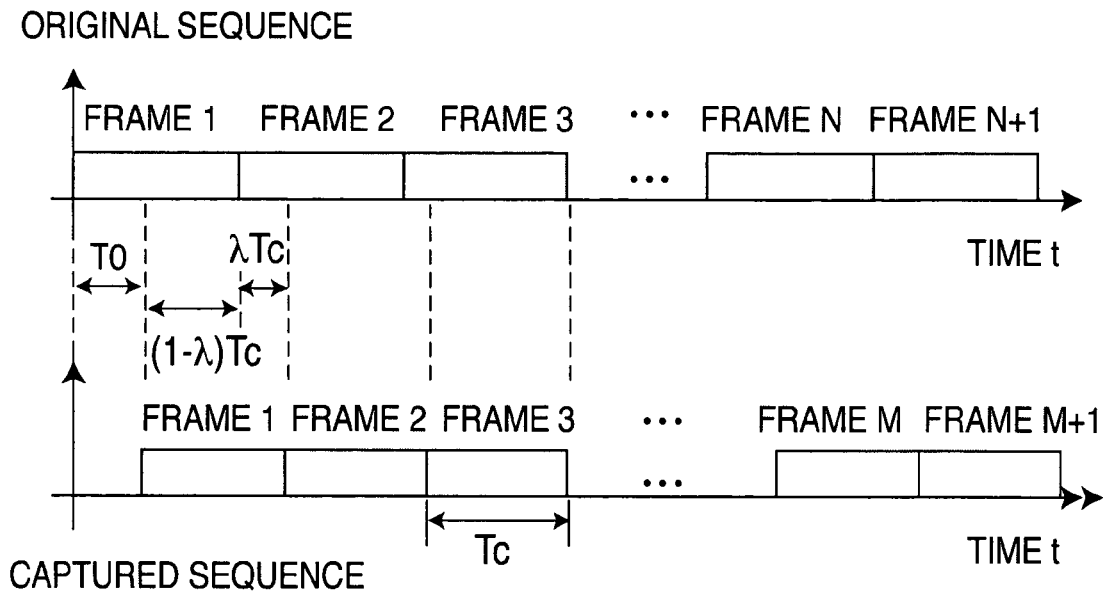
FIG. 3 graphically illustrates temporal misalignment resulting from differences in both frame rate and starting time between original and processed video sequences.

FIG. 3 graphically illustrates temporal misalignment resulting from differences in both frame rate and starting time between original and processed video sequences. As a result of these differences, processed Frame 1 of FIG. 3, for example, will be based on both original Frame 1 and original Frame 2. When the frame rate of capture is greater than or equal to ½ the frame rate of display, a processed frame $J_j$ can be modeled as a linear combination of two consecutive original video frames $I_i$ and $I_{i-1}$, according to the temporal mapping function of Equation (5) as follows:

$$J_j = \phi(I_i, I_{i-1}; \lambda_{ji}) = \lambda_{ji} \cdot I_i + (1-\lambda_{ji}) \cdot I_{i-1}, \quad (5)$$

where $\lambda_{ji}$ is the fraction of exposure of original frame $I_i$ in processed frame $J_j$, where $\lambda_{ji}$ is greater than 0 and less or equal to 1.

Because there is no explicit relationship between i (the original video frame number) and j (the corresponding processed video frame number), the temporal mapping function of Equation (5) can be used to model not only frame integration, but also frame dropping and frame repeating, which are widely used temporal manipulations of digital video. In particular, frame dropping can be modeled by increasing i by more than one for two consecutive processed frames. Similarly, frame repeating can be modeled by keeping i constant for two or more consecutive processed frames.

Given the definition of the temporal mapping operation, the minimization of Equation (2) can be rewritten as Equation (6) as follows:

$$[\alpha_0^*, \lambda_0^* \ldots, \alpha_M^*, \lambda_M^*] = \quad (6)$$

$$\arg\min_{[\lambda_0,\ldots,\lambda_M,\alpha_0\leq\ldots\leq\alpha_M]} \sum_{j=0}^{M} \|J_j - \varphi[I_{\alpha_j}, I_{\alpha_{j-1}}; \lambda_j]\|^2$$

Minimization of Local Predication Error

The dynamic programming described previously involves minimizing the local prediction error defined in Equation (4). With the temporal mapping function defined in Equation (5), the goal is to minimize the matching error between the current processed frame $J_j$ and the temporally mapped frame that approximates the processed frame, as represented by Equation (7) as follows:

$$\delta(i, j) = \min_{k(j)} \|J_j - \varphi_{k(j)}[I_{i-\beta(k(j))+1}, \ldots, I_i]\|^2 \quad (7)$$

$$= \min_{\lambda_{ji}} \|J_j - \varphi[I_i, I_{i-1}; \lambda_{ji}]\|^2$$

$$= \min_{\lambda_{ji}} \|J_j - (\lambda_{ji} I_k + (1+\lambda_{ji}) I_{k-1})\|^2$$

over $\lambda_{ji}$ for any given processed frame $J_j$ and original frames $I_i$ and $I_{i-1}$.

The mean squared error ε(P, Q) between two frames P and Q can be given by Equation (8) as follows:

$$\varepsilon(P, Q) = \frac{1}{HW} \sum_{h=0}^{H-1} \sum_{w=0}^{W-1} (P_{h,w} - Q_{h,w})^2, \qquad (8)$$

where $P_{h,w}$ and $Q_{h,w}$ are pixels in frames P and Q, respectively, and H and W are the height and width of each frame. In the context of the present invention, frame P may be the current processed frame $J_j$ and frame Q may be the corresponding "temporally mapped" frame generated using the linear combination of original frames $I_i$ and $I_{i-1}$ as defined in Equation (5).

In addition, the "cross correlation" $\zeta(P; R, Q)$ between the difference between $(P_{h,w} - Q_{h,w})$ and $(P_{h,w} - R_{h,w})$ can be defined according to Equation (9) as follows:

$$\zeta(P; R, Q) = \frac{1}{HW} \sum_{h=0}^{H-1} \sum_{w=0}^{W-1} (P_{h,w} - Q_{h,w})(P_{h,w} - R_{h,w}), \qquad (9)$$

where frame P is the current processed frame, and frames Q and R are two possible temporally mapped consecutive frames in the original sequence corresponding to frame P. Then, the value of $\lambda_{ji}$ that minimizes Equation (7) (i.e., $\lambda^*_{ji}$) can be computed in closed form according to Equation (10) as follows:

$$\lambda^*_{ji} = \max\left(0, \min\left(1, \frac{\varepsilon(J_j, I_i) - \zeta(J_j; I_i, I_{i-1})}{\varepsilon(J_j, I_i) - 2\zeta(J_j; I_i, I_{i-1}) + \varepsilon(J_j, I_{i-2})}\right)\right), \qquad (10)$$

and the minimal MSE can be represented according to Equation (11) as follows:

$$\min_{0 \le \lambda_{ji} \le 1} \|J_j - \varphi(I_i, I_{i-1}; \lambda_{ji})\|^2 = \qquad (11)$$
$$\min\left(\frac{\varepsilon(J_j, I_i)\varepsilon(J_j, I_{i-1}) - \zeta^2(J_j; I_i, I_{i-1})}{\varepsilon(J_j, I_i) - 2\zeta(J_j; I_i, I_{i-1}) + \varepsilon(J_j, I_{i-2})}, \varepsilon(J_j, I_i), \varepsilon(J_j, I_{i-1})\right)$$

Contextual Constraints

Video registration is an ill-posed inverse problem. For a given original video and a processed video, there may exist more than one solution. However, due to the nature of the prior knowledge of the application, the solutions to the same problem may have significantly different probabilities. For example, frame repeating and frame dropping are usually used infrequently, and they seldom apply to two or more consecutive frames. For example, when there are a large number of consecutive similar frames, they are more likely from a scene of little motion than caused by consecutive uses of frame repeating.

Contextual constraints are derived from the prior knowledge of what a solution must satisfy. The use of contextual constraints can reduce the solution space, improve the accuracy, and increase the robustness against noise. One contextual constraint already used is the causal constraint on matching indices (e.g., a feasible path must be a non-decreasing path). However, not all monotonically increasing paths among the state space are allowed. For example, when a change of frame occurs during the capture, $0 < \lambda < 1$, if $\alpha_j = \alpha_{j+1}$, then either $\lambda_j = \lambda_{j+1}$ (which represents frame repeat), or $0 < \lambda_j < \lambda_{j+1} = 1$. That is, if two consecutive processed frames correspond to the same set of original frames, then, except when the second of the two consecutive processed frames is a repeat of the first of the two. In other words, if the first of two consecutive processed frames results from the integration of two original frames, then the second processed frame cannot be based on an integration of those same two original frames, since the display of the first original frame ended during the integration of the first processed frame. Other results, such as $0 < \lambda_j < \lambda_{j+1} < 1$ or $\lambda_j > \lambda_{j+1}$ are invalid.

Instead of being listed as a set of rules, the contextual constraints can be incorporated into the optimization process in the form of a state transition cost $C(\phi_{k(j)} \alpha_j; \phi_{k(j-1)} \alpha_{j-1})$, which is a function of the mapping functions and the matching indices of both the current and the previous distorted frames. Therefore, the cost function used in Equation (2) becomes:

$$\sum_{j=0}^{M} \|J_j - \varphi_{k(j)}[I_{\alpha(j) - \beta(k(j))+1}, \ldots, I_{\alpha(j)}]\|^2 + C(\varphi_{k(j)}, \alpha_j; \varphi_{k(j)}, \alpha_j), \qquad (12)$$

where the first term is called the matching term and the second term is called the context term.

Figure 4:
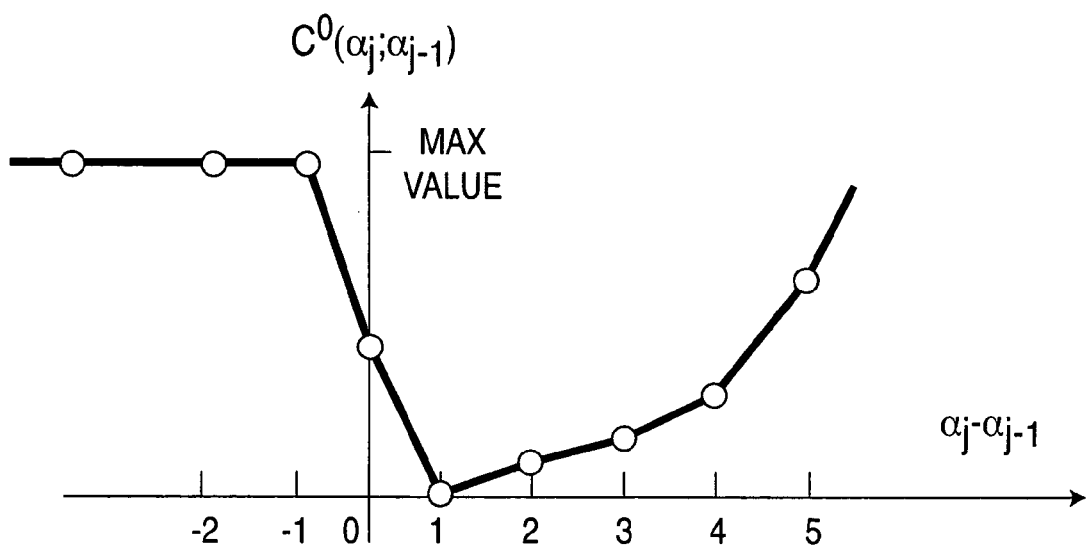
FIG. 4 shows a plot of one possible state transition cost as a function of the difference between the matching indices for two consecutive processed frames, which function enforces contextual constraints.

FIG. 4 shows a plot of one possible state transition cost $C^0(\alpha_j; \alpha_{j-1})$ as a function of the difference between the matching indices $\alpha_{j-1}$ and $\alpha_j$ for two consecutive processed frames, which function enforces the following contextual constraints:

(1) $C^0(\alpha_j; \alpha_{j-1})$ is set to the maximum distortion level when $\alpha_j < \alpha_{j-1}$ to enforce the causal constraint.

(2) $C^0(\alpha_j; \alpha_{j-1})$ is only 0 when $\alpha_j = \alpha_{j-1} + 1$. This encourages (but does not require) the assumption that the matching index will increment by one from frame to frame in the processed video sequence. In other words, frame dropping, where the matching index does not increment, is penalized.

(3) $C^0(\alpha_j; \alpha_{j-1})$ is assigned a positive cost when $\alpha_j = \alpha_{j-1}$. This penalizes frame repeating. Therefore, frame repeating will be selected only if it reduces the matching error significantly.

Integration of Spatio-Temporal and Histogram Registration of Processed Video

In addition to temporal distortion, processed video also suffers from spatial misalignment and global changes of intensity (also referred to as histogram misalignment), such as gamma changes. The general model previously described for processed video effectively isolates the estimation of the matching indices from the optimization of the mapping function. Since spatial and intensity (i.e., histogram) registration can be incorporated into the mapping operation $\phi_{k(j)}$, temporal registration can be performed together with either spatial registration or histogram registration or both all in the same optimization process using dynamic programming.

Model of Histogram Misalignment

Modern camcorders are sophisticated video recording systems. In order to produce visually pleasing videos, a set of algorithms is typically used to improve the appearance of a processed video. Some of these algorithms will alter the RGB histograms of the processed video. The most important one is Automatic Gain Control (AGC). Depending on the average luminance, AGC will adjust the sensitivity of the camcorder by applying a gain to the processed video signal. In addition, White Balance, which determines what color is white, also affects the histogram. Finally, the end-to-end gamma from display to capture might not be unity. When the forensic watermark only modifies the luminance component, only histogram of the luminance needs to be corrected.

Histogram transformation, also known as histogram shaping, maps one histogram to another. Histogram transformation can be represented using a table look-up. For example, for each frame, the transformation may have 256 parameters that map gray levels in a processed video frame to those in the original frame.

Let $H_r(u)$ and $H_c(v)$ be the normalized histograms of a reference video frame (which may in turn correspond to the linear combination of two video frames from the original video sequence) and the corresponding processed video frame, respectively. That is, $H_r(u)$ is the percentage of pixels that have gray level u in the reference frame, and $H_c(v)$ is the percentage of pixels that have gray level v in the processed frame. Then, the histogram mapping that maps the histogram of the processed video frame to the histogram of the reference frame, $u=\phi_h(v)$, can be computed as follows. For a given v, let $u_0(v)$ be the largest u such that $$\sum_{u=0}^{u_0(v)} H_r(u) < \sum_{u=0}^{v} H_c(u),$$

and $u_1(v)$ be the smallest u such that $$\sum_{u=0}^{u_1(v)} H_r(u) \geq \sum_{u=0}^{v} H_c(u),$$

respectively. Then, $$\varphi_h(v) = \sum_{u=u_0(v)+1}^{u_1(v)} u \cdot H_r(u) \bigg/ \sum_{u=u_0(v)+1}^{u_1(v)} H_r(u).$$

Further information on histogram misalignment, registration, and correction may be found in A. K. Jain, *Fundamentals of Digital Image Processing*, Prentice Hall, 1989, the teachings of which are incorporated herein by reference.

Model of Spatial Misalignment

Many factors can lead to spatial distortion in processed video. First, the camcorder is generally not placed on the optical axis of the projector. In addition, each capture may use different zoom or crop parameters. Finally, the camcorder might not be completely stationary during the capturing process. Therefore, a processed video is usually a perspective projection of the original video.

Let (x, y, z) be a point on the camcorder's imaging plane and (X, Y, Z) be a point on the screen on which the video is projected. Then, the perspective transform from (X, Y, Z) to (x, y, z) can be expressed as Equation (13) as follows:

$$\begin{bmatrix} x \\ y \\ z \\ 1 \end{bmatrix} = P \cdot \begin{bmatrix} X \\ Y \\ Z \\ 1 \end{bmatrix} = \begin{bmatrix} m_{xx} & m_{xy} & m_{xz} & m_x \\ m_{yx} & m_{yy} & m_{yz} & m_y \\ m_{zx} & m_{zy} & m_{zz} & m_z \\ 0 & 0 & 0 & 1 \end{bmatrix} \cdot \begin{bmatrix} X \\ Y \\ Z \\ 1 \end{bmatrix}, \quad (13)$$

where P is the perspective transformation matrix. When the rotation factor can be ignored, $m_{xx}$, $m_{yy}$, and $m_{zz}$ are the scaling factors, and $m_x$, $m_y$, and $m_z$ are the transitions in X, Y, and Z directions, respectively. In some applications, it may be sufficient to assume that the transformation is plane perspective (also known as the bomography transformation), thereby eliminating the dependency on the depth and reducing the number of independent parameters to 8.

Further information on spatial misalignment, registration, and correction may be found in R. Kumar, H. S. Sawhney, J. C. Asmuth, A. Pope, and S. Hsu, "Registration of video to geo-referenced imagery," *Proc. ICPR* 98, Brisbane. Australia, August 1998, and in S. Baudry, P. Nguyen, H. Maitre, "Estimation of geometric distortions in digital watermarking," *Proc. of IEEE Int'l Conf. on Image Processing*, Rochester, N.Y., September 2002, the teachings of both of which are incorporated herein by reference.

Combined Frame-Level Video Processing Model

To register processed video sequences not only temporally, but also spatially and intensity-wise, the model can be expanded by assuming that the same spatial and histogram transformations are applied to both original frames used to form each processed frame. In that case, the mapping operation defined in Equation (5) can be represented by Equation (14) as follows:

$$\begin{aligned} J_j &= \varphi(I_i, I_{i-1}; \lambda_{ji}, \psi, \rho) \\ &= \lambda_{ji} \cdot \rho(\psi(I_i)) + (1 - \lambda_{ji}) \cdot \rho(\psi(I_{i-1})) \\ &= \rho(\psi(\lambda_{ji} \cdot I_i + (1 - \lambda_{ji}) \cdot I_{i-1})), \end{aligned} \quad (14)$$

where $\psi(\cdot)$ is the spatial transformation and $\rho(\cdot)$ is the histogram transformation. Although the composition of Equation (14) depends on the order of how the three transformations are combined, the differences among different compositions are small and can be ignored.

The minimization of local predication for each node previously proposed also needs to include spatial registration and intensity registration (e.g., histogram shaping). However, since spatial misalignment and global changes of the histogram are inter-related with the weighted summation of consecutive frames modeled in Equation (5), no closed form solution is available. As such, ICM (Iterative Condition Mode) processing can be used to minimize the local predication for each node. The basic idea of ICM is to fix a set of parameters and optimize on the rest. In the present case, ICM is implemented by fixing, two of the three sets of parameters and optimizing the third. For one possible implementation, at each iteration, ICM first performs spatial registration, followed by histogram shaping, and then temporal registration by computation of $\lambda^*_{ji}$ using Equations (10) and (11). The procedure will iterate until it converges (i.e., when the changes in spatial, histogram, and temporal parameters are less than specified thresholds) or until a specified maximum number of iterations is reached. Using ICM, the optimization of local prediction becomes three optimizations: optimization of temporal frame integration, spatial registration, and histogram registration.

Histogram Registration Constraint

If there are no contextual constraints imposed, the histogram registration can fail in some special cases. For example, when an original video contains a black frame, any frame in the processed sequence can be mapped to the black frame by histogram registration with an MSE of 0, which obviously is not a desired solution. To address this situation, a contextual constraint can be defined for histogram registration that is proportional to the mutual information between the colors of the processed sequence and the colors of the original sequence according to Equation (15) as follows:

$$C(I_i, J_j) = -w \cdot (H(I_i) + H(J_j) - H(I_i, J_j)) \quad (15)$$

where w is a scalar weight, and $H(I_i)$ is the entropy of probability computed from the normalized histogram of frame $I_i$. When frame $I_i$ is a black frame or when frames $I_i$ and $J_j$ are independent, the contextual cost is 0. When frames $I_i$ and $J_j$ have a deterministic relationship, the contextual cost is the entropy of the normalized histogram of frame $I_i$ or frame $J_j$.

Global Matching Constraint

There is also a global constraint for the temporal registration that is useful to register the processed video sequence to the original one. For processed video, the effective length of the processed video should equal to the effective length of the displayed video, where the effective length is the length between the first and the last frames of a video sequence. Therefore, the temporal correspondence between the processed frames and the original frames is relatively fixed. This constraint can be implemented as a global contextual constraint according to Equation (16) as follows:

$$C(\alpha(j)) = w_\alpha \cdot \left| \alpha(j) - \frac{r_c}{r_o} j - \alpha(0) \right|, \quad (16)$$

where $r_o$ and $r_c$ are the frame rates of original and processed sequences, respectively, and $w_\alpha$ is a scalar weight.

Possible Implementation

Figure 5:
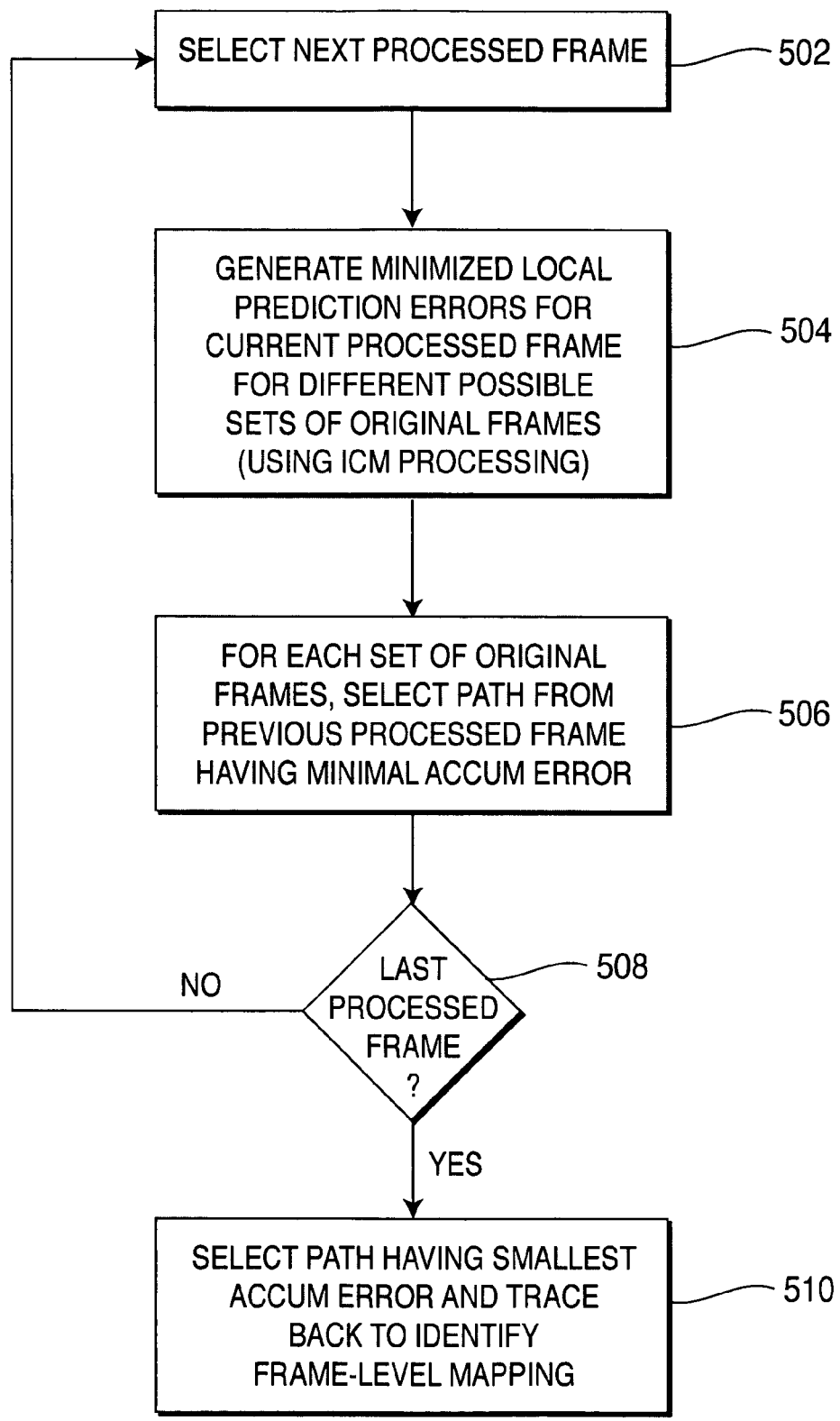
FIG. 5 shows a flow diagram of a solution to the registration problem using dynamic programming, according to one possible embodiment of the present invention.

FIG. 5 shows a flow diagram of a solution to the registration problem using dynamic programming, according to one possible embodiment of the present invention. According to this embodiment, the processed video sequence is analyzed frame-by-frame from the first frame 0 to the last frame M (steps 502 and 508). Those skilled in the art will appreciate that, in other embodiments, the analysis can be organized differently.

For each processed frame, a minimized local prediction error is generated for each of one or more different sets of one or more original frames that could correspond to the current processed frame (step 504). For example, applying the global matching constraint of Equation (16) to the temporal mapping function of Equation (5) implies that there are only a limited number of different corresponding pairs of original frames that could be used to generate any given processed frame. Step 504 involves the generation of a different minimized local prediction error (e.g., using Equation (7)) for each of these different possible pairs of original frames. Depending on the particular implementation, the minimized local prediction error of step 504 could be generated using any combination of temporal, spatial, and histogram registration. As described in previously, when temporal registration is combined with spatial and/or histogram registration, ICM processing can be used to generate the minimized local prediction error for each different mapping of original frames to the current processed frame.

For each mapping of original frames to the current processed frame, select the path (as in FIG. 2) corresponding to the smallest accumulated prediction error (step 506). As indicated in FIG. 2, each processed frame can be reached via a finite number of paths corresponding to the previous processed frame, each of which will have an accumulated prediction error associated with it. For each mapping identified in step 504, step 506 involves the selection (and extension to the current processed frame) of the path that minimizes the accumulated prediction error.

After the entire processed video sequence has been processed, there will be a number of different possible paths identified that map the original video sequence to the processed video sequence. The path having the smallest accumulated prediction error is selected as the optimal mapping of the original sequence to the processed sequence, where the path can be traced back to identify the frame-by-frame mapping between the original sequence and the processed sequence (step 510). In this way, the entire processed video sequence can be registered with respect to the original video sequence at the frame level.

Although the present invention has been described in the context of a video frame as a single entity, those skilled in the art will understand that the invention can also be applied in the context of interlaced video streams and associated field processing. As such, unless clearly inappropriate for the particular implementation described, the term "frame," especially as used in the claims, should be interpreted to cover applications for both video frames and video fields.

Moreover, the present invention has described local prediction error as being based at the frame level. Those skilled in the art will understand that, in certain implementations, local prediction error could also be based at the level of sets of two or more frames, but fewer than the entire video sequence level. In that sense, the notion of local prediction error could be thought of as being at the sub-sequence level, where each video sub-sequence corresponds to one or more (but not all) of the frames in the video sequence, where the term frame could refer to either a video frame or a video field.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for identifying correspondence between an original video sequence comprising a plurality of original frames and a processed video sequence comprising a plurality of processed frames, the method comprising: (a) dividing the processed video sequence into a plurality of processed sets, each processed set having one or more processed frames; (b) identifying, for each processed set, one or more original sets from the original video sequence, wherein: each original set comprises one or more original frames; and two or more original sets are identified for at least one processed set; (c) generating a mapping for each original set corresponding to each processed set, wherein: the mapping defines, for the original set, a mapped set that approximates the corresponding processed set; and the mapping minimizes a local prediction error between the mapped set and the corresponding processed set; and (d) selecting, for each processed set, the original set whose mapping minimizes an accumulated prediction error for the processed video sequence; wherein generating each mapping involves minimizing the local prediction error using processing that (1) treats temporal, spatial, and histogram registration as three parameter sets, (2) fixes two of the three parameter sets, while optimizing the third, and (3) iterates on all three parameter sets until an optimal solution is found.

2. The invention of claim 1, wherein: each original set consists of one or two original frames; each mapped set consists of a single mapped frame; and each processed set consists of a single processed frame.

3. The invention of claim 1, wherein the temporal registration involves minimizing the local prediction error between a weighted sum of two original frames and a corresponding processed frame.

4. The invention of claim 1, wherein one or more constraints are applied to limit the number of different original sets that are identified for each processed set.

5. The invention of claim 4, wherein at least one constraint is a causal constraint that specifies that no original frames displayed in the past can be used to generate a current processed frame.

6. The invention of claim 1, wherein: a first selected original set corresponds to the first processed frame in the processed video sequence; and each other selected original set for each other processed frame depends on a selected original set corresponding to a previous processed frame.

7. The invention of claim 6, wherein the dependence between selected original sets is based on one or more constraints.

8. The invention of claim 7, wherein at least one constraint is a causal constraint that specifies that no original frames displayed in the past can be used to generate a current processed frame.

9. The invention of claim 1, wherein at least one original frame is not included in any mapping.

10. The invention of claim 1, wherein one processed frame is a repetition of the immediately preceding processed frame.

11. The invention of claim 1, wherein: each original set is selected based on a causal constraint that a matching index for each processed set conforms to a monotonically increasing function; the matching index identifies the original frame in each original set having the largest frame index; and frame indices increment by one from frame to frame in the original video sequence.

12. The invention of claim 1, wherein: the local prediction error between each mapped set and the corresponding processed set is a function of a matching term and a context term; the matching term characterizes differences between the mapped set and the corresponding processed set; and the context term corresponds to a cost associated with one or more contextual constraints applied to a temporal relationship between the original and processed video sequences.

13. The invention of claim 12, wherein the matching term corresponds to a mean squared error between the mapped set and the corresponding processed set.

14. The invention of claim 12, wherein the context term enforces a causal constraint that no previously displayed frames can be subsequently processed.

15. The invention of claim 12, wherein the context term penalizes repetition and dropping of original frames.

16. The invention of claim 12, wherein: the context term encourages an assumption that a matching index increments by one from frame to frame in the processed video sequence; the matching index identifies the original frame in each original set having the largest frame index; and frame indices increment by one from frame to frame in the original video sequence.

17. The invention of claim 1, wherein the processed video sequence has been generated by capturing with a camcorder a display of the original video sequence.

18. The invention of claim 1, further comprising the steps of: (e) identifying a watermark in an original frame; and (f) determining whether a corresponding processed frame has a similar watermark.

19. The invention of claim 1, further comprising the step of adjusting the processed video sequence to correct for one or more misalignments between the original and processed video sequences.

20. The invention of claim 19, wherein the one or more misalignments include at least one of spatial misalignment and histogram misalignment.

21. The invention of claim 20, wherein the one or more misalignments include both spatial misalignment and histogram misalignment.

22. A tangible computer-readable medium, having encoded thereon program code, wherein, when the program code is executed by a computer the computer, implements a method for identifying correspondence between an original video sequence comprising a plurality of original frames and a processed video sequence comprising a plurality of processed frames, the method comprising: (a) dividing the processed video sequence into a plurality of processed sets, each processed set having one or more processed frames; (b) identifying, for each processed set, one or more original sets from the original video sequence, wherein: each original set comprises one or more original frames; and two or more original sets are identified for at least one processed set; (c) generating a mapping for each original set corresponding to each processed set, wherein: the mapping defines, for the original set, a mapped set that approximates the corresponding processed set; and the mapping minimizes a local prediction error between the mapped set and the corresponding processed set; and (d) selecting, for each processed set, the original set whose mapping minimizes an accumulated prediction error for the processed video sequence; wherein generating each mapping involves minimizing the local prediction error using processing that (1) treats temporal, spatial, and histogram registration as three parameter sets, (2) fixes two of the three parameter sets, while optimizing the third, and (3) iterates on all three parameter sets until an optimal solution is found.

23. An apparatus for identifying correspondence between an original video sequence comprising a plurality of original frames and a processed video sequence comprising a plurality of processed frames, the apparatus comprising: (a) means for dividing the processed video sequence into a plurality of processed sets, each processed set having one or more processed frames; (b) means for identifying, for each processed set, one or more original sets from the original video sequence, wherein: each original set comprises one or more original frames; and two or more original sets are identified for at least one processed set; (c) means for generating a mapping for each original set corresponding to each processed set, wherein: the mapping defines, for the original set, a mapped set that approximates the corresponding processed set; and the mapping minimizes a local prediction error between the mapped set and the corresponding processed set; and (d) means for selecting, for each processed set, the original set whose mapping minimizes an accumulated prediction error for the processed video sequence; wherein generating each mapping involves minimizing the local prediction error using processing that (1) treats temporal, spatial, and histogram registration as three parameter sets, (2) fixes two of the three parameter sets, while optimizing the third, and (3) iterates on all three parameter sets until an optimal solution is found.

* * * * *